United States Patent
Liao

(10) Patent No.: US 6,416,005 B1
(45) Date of Patent: Jul. 9, 2002

(54) APPARATUS FOR REDUCING RADIAL FRICTION IN A WIRE WINDING BOX

(76) Inventor: Sheng-Hsin Liao, No. 10, Alley 38, Lane 229, San Chun St., Shulin, Taipei Hsien (TW)

( * ) Notice: Subject to any disclaimer, the term of this patent is extended or adjusted under 35 U.S.C. 154(b) by 12 days.

(21) Appl. No.: 09/631,769

(22) Filed: Aug. 3, 2000

(30) Foreign Application Priority Data

Jul. 14, 2000 (TW) ........................................ 89212199 A

(51) Int. Cl.⁷ ............................................. B65H 75/48
(52) U.S. Cl. ............................... 242/378.1; 242/378.4; 242/385.1; 242/385.3; 242/388.1; 242/388.6; 242/586.2; 242/532.5; 242/378; 242/107.1
(58) Field of Search ........................... 242/378.1, 378.2, 242/378.4, 385.1, 385.3, 388.1, 388.6, 85, 378, 74.1, 107.1, 107.6

(56) References Cited

U.S. PATENT DOCUMENTS

| | | | | |
|---|---|---|---|---|
| 3,061,234 A | * | 10/1962 | Morey | 242/107.1 |
| 4,266,738 A | * | 5/1981 | Nakagawa | 242/74.1 |
| 4,757,955 A | * | 7/1988 | Simmons | 242/107.6 |
| 5,022,600 A | * | 6/1991 | Blanc | 242/107.1 |
| 5,094,396 A | * | 3/1992 | Burke | 242/107.1 |
| 5,230,481 A | * | 7/1993 | Wheeler | 242/107.1 |
| 5,280,861 A | * | 1/1994 | Corriveau | 242/85 |
| 5,332,171 A | * | 7/1994 | Steff | 242/378 |
| 5,588,626 A | * | 12/1996 | Yang | 242/378.1 |
| 5,655,726 A | * | 8/1997 | Peterson | 242/378.2 |
| 5,797,558 A | * | 8/1998 | Peterson | 242/373 |
| 5,853,136 A | * | 12/1998 | Lai | 242/388.1 |
| 6,254,025 B1 | * | 7/2001 | Liao | 242/378.1 |

* cited by examiner

Primary Examiner—Donald P. Walsh
Assistant Examiner—Roberto DiMichele
(74) Attorney, Agent, or Firm—Rosenberg, Klein & Lee

(57) ABSTRACT

A wire winding box for reducing radial friction, especially a wire winding box for reducing radial friction of a communication wire, is disclosed. A fixing piece is installed in the through hole in the wire winding ring of wire winding disk. The fixing piece serves to clamp and fix the communication wire passing through the through hole so that the communication wire in the wire winding ring can not be pulled. When one end of the communication wire is pulled from the wire winding box, the section of the communication wire in the wire winding ring can not be pulled out. Therefore, as the communication wire is wound back to the wire winding box, the frictions between different sections of the communication wire and between the communication wire and the wire winding ring will not occur. Therefore, the communication wire and the whole wire winding box have a longer lifetime.

2 Claims, 7 Drawing Sheets

APPARATUS FOR REDUCING RADIAL FRICTION IN A WIRE WINDING BOX

FIELD OF THE INVENTION

The present invention relates to a wire winding box for reducing radial friction, and especially to a wire winding box for reducing radial friction against a communication wire.

BACKGROUND OF THE INVENTION

The current communication devices, such as computers, modems, telephones, or fax machines, need communication wires to connect these devices for communication. However, in order to keep a communication wire from being too long to be wound or too short for effective use, there are various wire winding boxes being designed.

Referring to FIG. 1, a prior art wire winding box includes a box body 1a, a housing 2a, a communication wire 3a, two wire winding discs 4a and two spiral springs 5a. The box body 1a has two faces each being installed with a wire groove 11a for receiving the communication wire 3a. Each lateral side of the wire grooves 11a is installed with a wire hole 12a at an appropriate place for passing the two ends of the communication wire 3a therethrough. The inner lateral side of the wire groove 11a is formed with a shaft 13a. Each shaft 13a is axially installed with a groove hole 14a.

The housing 2a is formed by a first casing 21a and a second casing 22a, which can be buckled to the two surfaces of the box body 1a for sealing the two wire grooves 11a so as to position the communication wire 3a, wire winding disk 4a, and spiral spring 5a in the box body 1a.

Two wire winding disks 4a has a central axial hole for 42a. Two surfaces of the disk 41a are formed with a spring fixing post 43a and a wire winding ring 44a. The spring fixing post 43a and the wire winding ring 44a surround the periphery of the central axial hole 42a and are concentric with the central axial hole 42a. The spring fixing post 43a is installed with a buckling hole 45a. The two wire winding disks 4a are received in the two wire grooves 11a in the box body 1a and are pivotally installed in the two shafts 13a through the axial holes 42a so that the wire winding disks 4a can rotate in the wire groove 11a.

The communication wire 3a has two ends each being installed with a plug 31a and an earphone 32a. The two ends of the communication wire 3a may be wound as two parts for matching in the two wire grooves 11a of the box body 1a. The middle part of the communication wire 3a passes through the groove holes 11a on the shafts 13a in the two wire grooves 11a. Therefore, the two ends of the communication wire 3a are disposed in the two wire grooves 11a. The communication wire 3a can be wound around the exterior 47a and interior 48a (see FIG. 2) of the wire winding ring 44a of the wire winding disk 4a. The plug 31a and earphone 32a at two ends of the communication wire 3a are protruded out from the wire holes 12a of the box body 1a.

Two spiral springs 5a are suitably installed in the two wire grooves 11a of the box body 1a respectively supported by support seats 7a. The buckling end 51a of each spiral spring 5a is buckled to the buckling hole 45a of the wire winding disk 4a. As the wire winding disk 4a rotates, the spiral spring 5a will store potential energy.

A wire winding box 4 can be assembled where the wire groove 11a serves to receive a section of the communication wire 3a having a relatively long length, and the section can be rewound as desired. The user may insert the plug 31a of the communication wire 3a to a receptacle of a relative communication device for downloading relative data. The two ends of the communication wire 3a can be pulled out directly from the wire winding box. The two ends of the communication wire 3a are pulled by the spiral spring 5a in the box so that a certain pulling force is retained thereon, and thus the communication wire 3a can be wound back into the box. Therefore, the wire is prevented from protruding out of the box when not in use.

In order to ensure that the user's pull of the communication wire 3a is not overly hindered by the tension of the winding force, the periphery of the wire winding disk 4a is installed with a plurality of buckling grooves 46a and a control device 6a. The control device 6a includes a swinging piece 61a swinging freely and a ratchet 62a rotating freely. By the special relationship connecting the swinging piece 61a, ratchet 62a, and the buckling groove 46a of the wire winding disk 4a, the communication wire 3a can be fixed or rewound by pulling and releasing.

However, in the prior art wire winding box, after the communication wire 3a passes through the groove holes 11a from the grove hole 14a, it winds around the shaft 13a in the interior 48a of the wire winding disk 41a, and then passes through the through hole 49a preset on the wire winding ring 44a to the exterior 47a of the wire winding ring 44a. Then, it protrudes out from the wire hole 12a to the outer side of the wire winding box. When one end of the communication wire 3a is pulled out from the wire winding box, it will at first pull the communication wire 3a wound around the exterior 47a of the wire winding ring 44a. Then, the interior 48a of the wire winding ring 44a will be pulled out until the communication wire 3a of the exterior 47a of the wire winding ring 44a is fully pulled out. Then, it pulls the communication wire 3a on the shaft 13a wound in the interior 48a of the wire winding ring 44a. When the communication wire 3a is wound back to the wire winding box, the communication wire 3a will wind around the exterior 47a (FIG. 2A) of the wire winding ring 44a, and at the time that the communication wire 3a winds around the exterior 47a of the wire winding ring 44a, the communication wire 3a may wind around the shaft 13a of the interior 48a of the wire winding ring 44a. The section of the communication wire 3a wound around the interior 48a of the wire winding ring 44a is provided by the communication wire 3a wound around the exterior 47a of the wire winding ring 44a (see FIG. 2B). However, when the communication wire 3a wound around the exterior 47a of the wire winding ring 44a is pulled, significant friction will occur between different sections of the communication wire 3a and between the communication wire 3a and the wire winding ring 44a. Such friction will induce damage to the surface of the communication wire 3a; therefore, the interior lead will be damaged so that the life of the communication wire 3a and the whole wire winding box will be reduced.

SUMMARY OF THE INVENTION

Accordingly, the primary object of the present invention is to provide a wire winding box for reducing radial friction, and especially to a wire winding box for reducing radial friction of a communication wire. A fixing piece is installed in the through hole in the wire winding ring of the wire winding disk. The fixing piece serves to clamp and fix the communication wire passing through the through hole so that the communication wire in the wire winding ring cannot be pulled. When one end of the communication wire is pulled from the wire winding box, the section of the communication wire in the wire winding ring cannot be pulled out. Therefore, as the communication wire is wound back into the wire winding box, it only winds around the exterior of the wire winding ring and not wound in the interior of the wire winding ring. The friction between different sections of the communication wire and between the communication wire and the wire winding ring will not occur. Therefore, the friction, which induces damage to the surface of the interior lead of the communication wire, will be avoided and, thus, the life of the communication wire and of the whole wire winding box will be increased. The communication wire and the whole wire winding box will have a longer life.

The various objects and advantages of the present invention will be more readily understood from the following detailed description when reading in conjunction with the appended drawing.

DETAILED DESCRIPTION OF THE PREFERRED EMBODIMENTS

Figure 1:
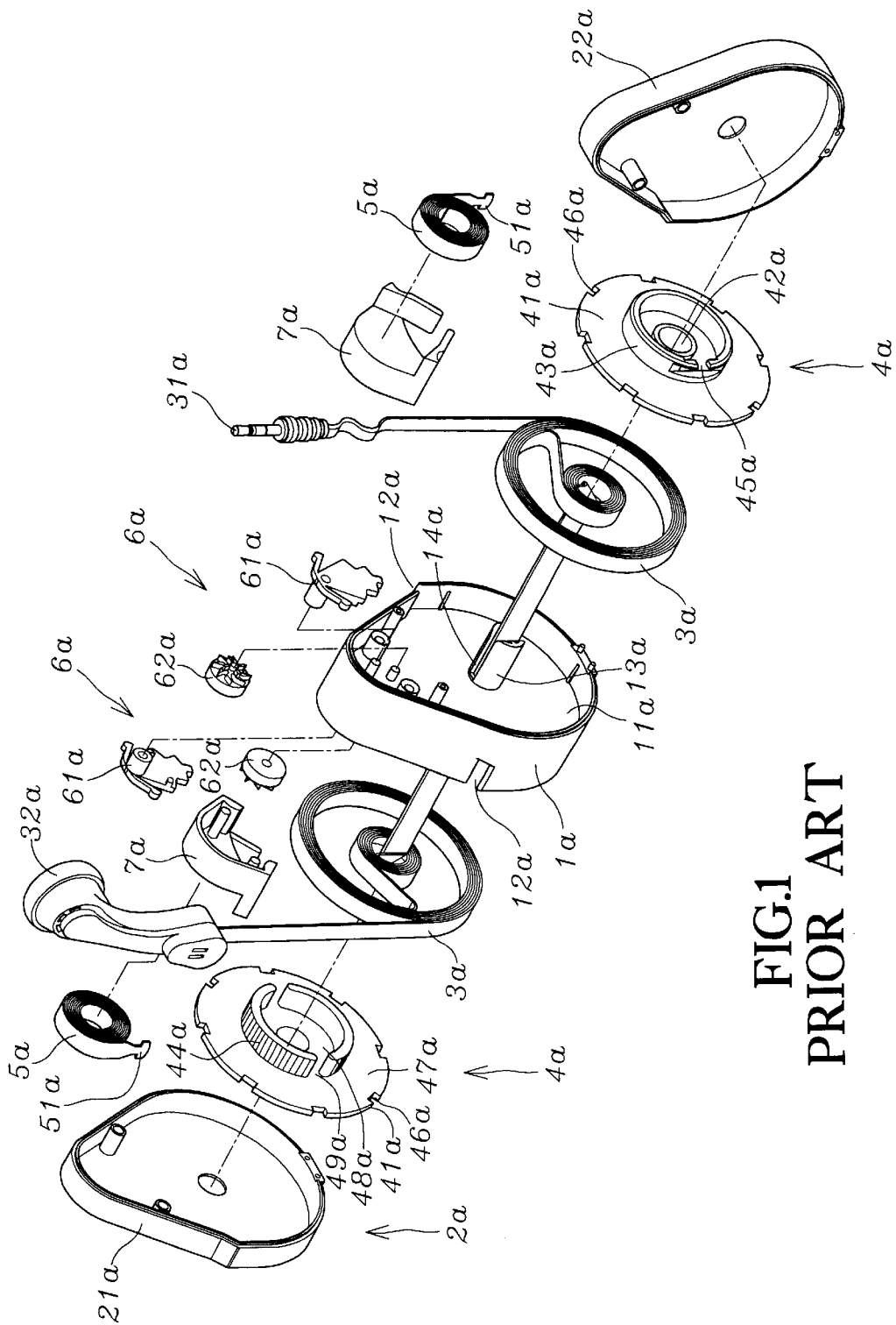
FIG. 1 is an exploded perspective view of a prior art device.
Figure 2:
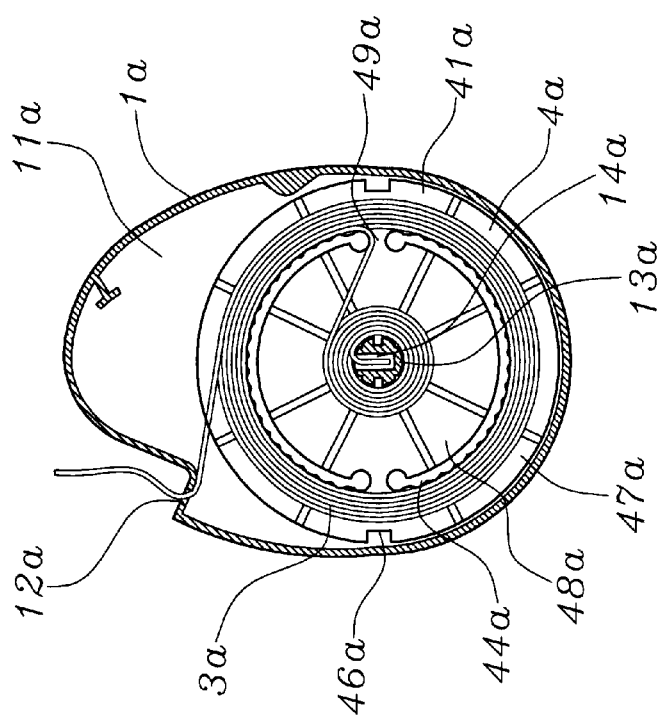
FIG. 2 is a plan view showing a prior art wire winding box.
Figure 2A:
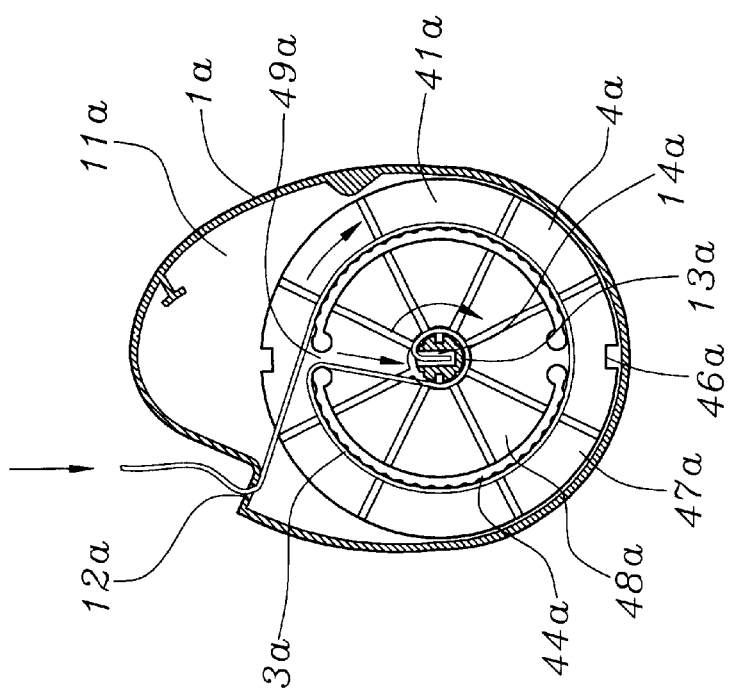
FIGS. 2A and 2B are plan views showing the wire winding of a prior art wire winding box.
Figure 2B:
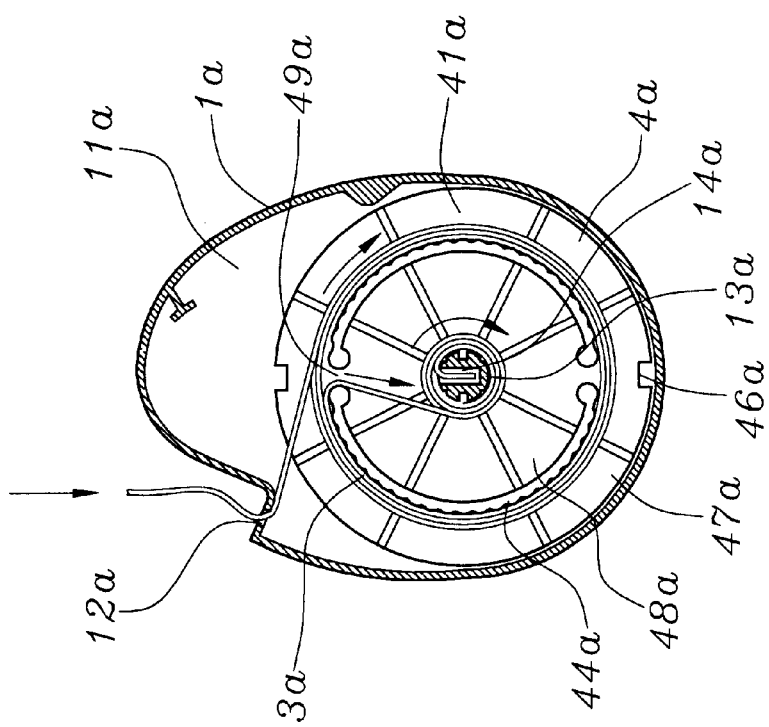
Figure 3:
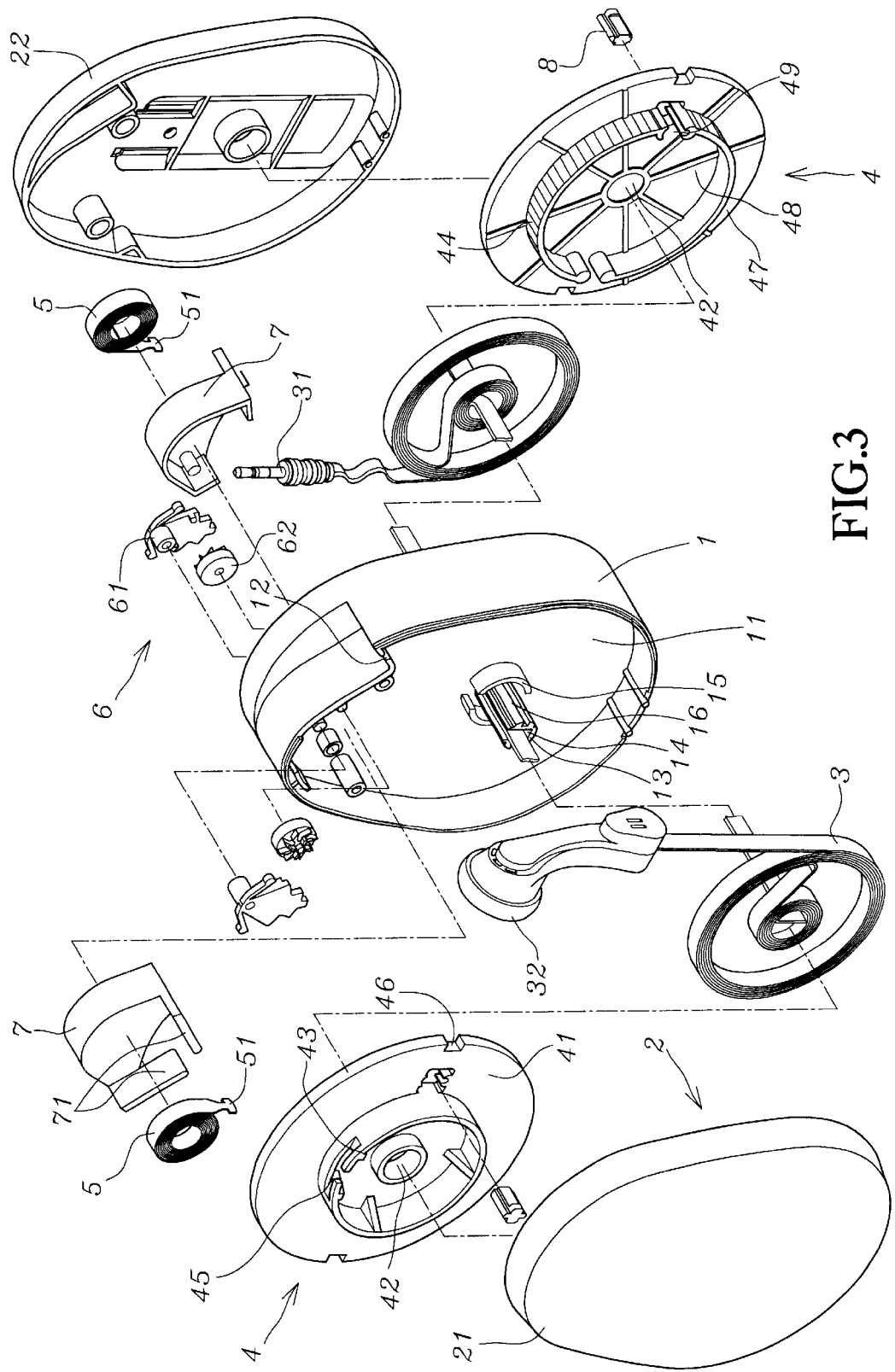
FIG. 3 is an exploded perspective view of the present invention.
Figure 4:
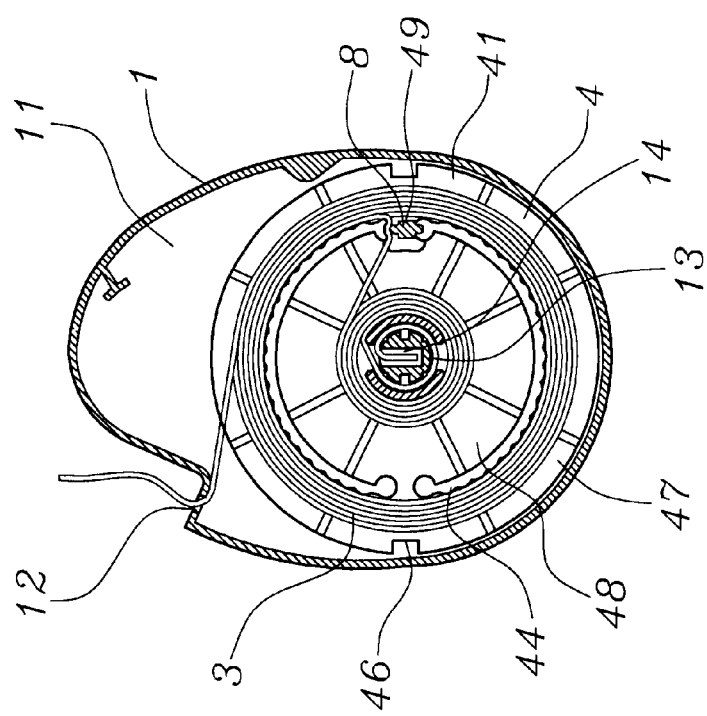
FIG. 4 is a plan view of the present invention.

With reference to FIGS. 3 to 4, the embodiment of a positioning device of the wire winding box for reducing radial friction according to the present invention is illustrated. The wire winding box includes a box body 1, a housing 2, a communication wire 3, two wire winding disks 4, and two spiral springs 5.

The box body 1 has two faces each being installed with a wire groove 11 for receiving the communication wire 3. Each lateral side of the wire grooves 11 is formed with a wire hole 12 at a suitable place for passing two ends of the communication wire 3. The inner lateral side of the wire groove 11 is formed with a shaft 13. Each shaft 13 is axially installed with a groove hole 14. The groove holes 14 in the two wire grooves 11 are communicated with one another. The inner lateral surface of the wire groove 11 is further installed with at least one positioning piece 15. Each positioning piece 15 has a round shape and surrounds the shaft 13, maintaining suitable spacing therefrom so that a positioning groove 16 is formed between each positioning piece 15 and the shaft 13.

The housing 2 is formed by a first casing 21 and a second casing 22, which can be buckled to the two surfaces of the box body 1 for sealing the two wire grooves 11 so as to position the communication wire 3, wire winding disk 4, and spiral spring 5 in the box body 1.

Each of the two wire winding disks 4 has a central axial hole 42. Two surfaces of the disk 41 are formed with a spring fixing post 43 and a wire winding ring 44. The spring fixing post 43 and the wire winding ring 44 surround the periphery of the central axial hole 42 and is concentric with the central axial hole 42. The spring fixing post 43 is installed with a buckling hole 45. The two wire winding disks 4 are received in the two wire grooves 11 in the box body 1 and are pivotally installed in the two shafts 13 through the axial holes 42 so that the wire winding disks 4 can rotate in the wire grooves 11.

The communication wire 3 has two ends respectively installed with a plug 31 and an earphone 32. Both of the two ends of the communication wire 3 may be installed with plugs 31 or other devices as desired. The two ends of the communication wire 3 may be wound as two parts for matching in the two wire grooves 11 of the box body 1. The middle part of the communication wire 3 passes through the groove holes 14 on the shafts 13 in the two wire grooves 11. Therefore, parts of the two ends of the communication wire are disposed in the two wire grooves 11. After the communication wire 3 passes through the groove holes 11 from the groove hole 14, it is at first wound around the shaft 13 in the interior 48 of the wire winding disk 4, and then passed through the through hole 49 preset on the wire winding ring 44 to the exterior 47 of the wire winding ring 44. Then, it protrudes out from the wire hole 12 to the outer side of the wire winding box. In the present invention, the communication wire 3 passes through the through hole 49 of the wire winding ring 44, and then passes to the exterior 47 of the wire winding ring 44. A fixing piece 8 is wedged in the through hole 49. The fixing piece 8 is wedged and fixed to the through hole 49, thereby clamping and fixing the communication wire 3 within the through hole 49.

Two spiral springs 5 are suitably installed in the two wire grooves 11 of the box body 1. The buckling end 51 of each spiral spring 5 is buckled to the buckling hole 45 of a wire winding disk 4 so that the two spiral springs 5 are connected to the two wire winding disks 4. As the wire winding disk 4 rotates, the spiral spring 5 will store potential energy.

Thereby, the wire winding box as shown in FIG. 4 can be assembled. The wire groove 11 serves to receive a section of the communication wire 3 having a relatively long length in a suitable manner. The user may insert the plug 31 of the communication wire 3 to a receptacle of a relative communication device for downloading relative data. The two ends of the communication wire 3 can be pulled out directly from the wire winding box. The two ends of the communication wire 3 are pulled by the spiral springs 5 in the box so that a certain pulling force is retained thereon, such that the communication wire can be wound back into the box. Therefore, the wire will not protrude out of the box when not in use.

A support seat 7 is installed in the wire groove 11 of the box body 1. Two sides of the support seat 7 are formed with two protruding stoppers 71 so that the spiral spring 5 can be received between the support seat 7 and the wall of the housing 2. In order to ensure that the user's pull of the communication wire 3 will not be overly hindered by the tension of the winding force, the periphery of the wire winding disk 4 is installed with a plurality of buckling grooves 46 and a control device 6. The control device 6 includes a swinging piece 61 swinging freely and a ratchet 62 rotating freely. By the special relationship connecting the swinging piece 61, ratchet 62, and the buckling groove 46 of the wire winding disk 4, the communication wire 3 can be fixed or rewound by pulling and releasing.

Figure 4A:
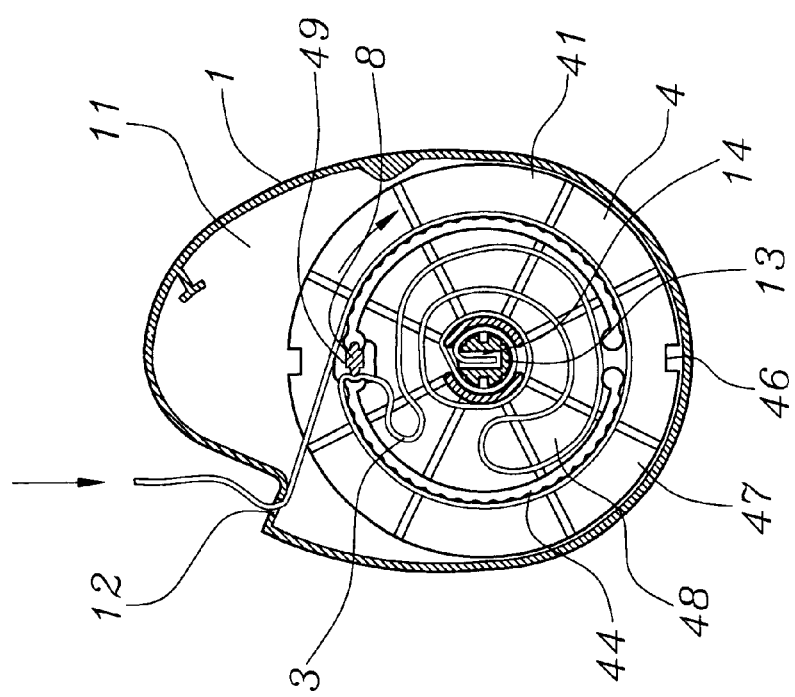
FIG. 4A is a plan view showing the wire winding of the present invention.

In the present invention, a fixing piece is installed in the through hole 49 in the wire winding ring 44 of the wire winding disk 4. The fixing piece 49 serves to clamp and fix the communication wire 3 passing through the through hole 49 so that the communication wire 3 in the interior 48 of the wire winding ring 44 cannot be pulled. When one end of the communication wire 3 is pulled out from the wire winding box, the communication wire 3 wound around the exterior 47 of the wire winding ring 44 may be pulled until the communication wire 3 around the exterior 47 of the wire winding ring 44 is completely pulled out. The communication wire 3 around the shaft 13 in the interior 48 of the wire winding ring 44 unwinds in the meantime, but remains retained within the interior 48 of the wire winding ring 44 (see FIG. 4A). As the communication wire 3 is wound back, the communication wire 3 simply winds around the exterior 47 of the wire winding ring 44. Sufficient slack remains in the communication wire 3 within the interior 48 of the wire winding ring 44 that, as the communication wire 3 is wound around the exterior 47, none of the wire 3 about the exterior 47 of the winding ring 44 need be pulled inwards. Hence, undue friction between the different sections of the communication wire 3 and between the communication wire 3 and the wire winding ring 44 is avoided. Therefore, damage to the surface of the communication wire 3 can be avoided effectively, and the interior lead is prevented from being damaged. Therefore, the present invention provides the communication wire 3 and the whole wire winding box a longer life.

In the present embodiment, a double wire winding disk 4 is disclosed, but of course, a single wire winding disk 4 can also be employed. Namely, one surface of the box body 1 is installed with a wire groove 11 which is further matched with a wire winding disk 4 and a spiral spring 5. The communication wire 3 is wound around the wire groove 11 in the box body 1. One end of the communication wire 3 protrudes out from the wire groove 11 of the box body 1. The other end of the communication wire 3 protrudes out from the wire groove hole 14 and is communicated to the outer environment.

In summary, the present invention improves upon the defects in prior art wire winding boxes. In the prior art, when the communication wire wound around the exterior of the wire winding ring is pulled, significant friction will occur between different sections of the communication wire and between the communication wire and the wire winding ring. Such friction will induce damage to the surface of the communication wire 3a; therefore, the interior lead will be damaged so that the life of the communication wire and of the whole wire winding box will be reduced. However, these problems are remedied by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wire winding box for reducing radial friction comprising:

a box body having a wire groove in at least one surface; each side of the wire groove having a wire hole; and an inner lateral side of the wire groove having a shaft and a groove hole communicated with an exterior;

a housing for sealing the wire groove;

at least one wire winding disk having a central axial hole at a center of the disk; an inner surface of the disk having a wire winding ring projecting therefrom to surround a periphery of the center axial hole; at least one through hole being formed in the wire winding ring; the wire winding disk being received in the wire groove of the box body in pivotally displaceable manner;

a communication wire coupled to the wire winding disk, the communication wire having first and second segments delineated by an intermediate portion extending therebetween and passing through the through hole of the wire winding ring, the first and second segments of the communication wire being captured by the inner surface of the wire winding disk against the wire groove of the box body; the first segment of the communication wire being releasably wound externally about the wire winding ring thereof; the second segment of the communication wire extending from the groove hole and being disposed within an interior of the wire winding ring on the wire winding disk; the communication wire having a first end passing through the wire hole of the box body and a second end passing through the groove hole of the box body;

at least one spiral spring positioned in the box body and being connected with the wire winding disk; and, a fixing piece engaging the through hole in releasably locked manner for clamping and fixing the intermediate portion of the communication wire to the wire winding ring and thereby adjustably delineate the first and second communication wire segments.

2. The wire winding box for reducing radial friction as claimed in claim 1, wherein an inner lateral surface of the wire groove is installed with at least one positioning piece; a positioning groove is formed between the positioning piece and the shaft; when the communication wire is inserted from the groove hole, it passes through the positioning groove and is clamped and positioned in the positioning groove.

* * * * *